US012682306B2

(12) United States Patent
Guha Majumder et al.

(10) Patent No.: US 12,682,306 B2
(45) Date of Patent: Jul. 14, 2026

(54) SYSTEM AND METHOD FOR DYNAMICALLY DETERMINING RESOURCE-HOLD-TIME RECOMMENDATIONS BASED ON ESTIMATED CAUSAL EFFECTS

(71) Applicant: Walmart Apollo, LLC, Bentonville, AR (US)

(72) Inventors: Soumojit Guha Majumder, Bangalore (IN); Chittaranjan Tripathy, Sunnyvale, CA (US); Subhasish Misra, Bangalore (IN); Somedip Karmakar, Bengaluru (IN); Swati Kirti, Bellevue, WA (US); Ojaswini Chhabra, San Francisco, CA (US); Srikar Gullapalli, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 84 days.

(21) Appl. No.: 18/653,757

(22) Filed: May 2, 2024

(65) Prior Publication Data
US 2025/0342427 A1     Nov. 6, 2025

(51) Int. Cl.
 *G06Q 10/0637* (2023.01)
 *G06Q 10/0631* (2023.01)
 *G06Q 30/0202* (2023.01)

(52) U.S. Cl.
 CPC . *G06Q 10/06375* (2013.01); *G06Q 10/06315* (2013.01); *G06Q 30/0202* (2013.01)

(58) Field of Classification Search
 CPC ....... G06Q 10/06375; G06Q 10/06315; G06Q 30/0202
 See application file for complete search history.

(56) References Cited

U.S. PATENT DOCUMENTS

| | | | |
|---|---|---|---|
| 2017/0323250 A1 | 11/2017 | Lindbo et al. | |
| 2019/0172082 A1* | 6/2019 | Ganti Mahapatruni | G06N 5/01 |
| 2020/0134420 A1* | 4/2020 | Spooner | H04W 4/023 |
| 2020/0410529 A1 | 12/2020 | Lebedev et al. | |

(Continued)

FOREIGN PATENT DOCUMENTS

| | | | | |
|---|---|---|---|---|
| CN | 114649087 A | * | 6/2022 | G06Q 10/02 |

OTHER PUBLICATIONS

English translation of CN114649087A (Year: 2022).*

(Continued)

*Primary Examiner* — Jeremy L Gunn
(74) *Attorney, Agent, or Firm* — DICKINSON WRIGHT RLLP; Hector A. Agdeppa

(57) ABSTRACT
A method can include upon receiving, from a policy update engine, one or more hold-time recommendations, selectively determining, based on one or more selection rules, one or more selected hold-time values of the one or more hold-time recommendations. The method further can include implementing the one or more selected hold-time values, as determined. The method additionally can include after implementing the one or more selected hold-time values, determining one or more effects associated with the one or more selected hold-time values. The method also can include transmitting the one or more selected hold-time values and the one or more effects to the policy update engine for retraining. Other embodiments are disclosed.

17 Claims, 7 Drawing Sheets

(56) References Cited

U.S. PATENT DOCUMENTS

| | | | | |
|---|---|---|---|---|
| 2021/0000346 A1* | 1/2021 | Fitzgibbons | ........... | A61B 5/746 |
| 2021/0097637 A1* | 4/2021 | Dursun | ................. | G06Q 10/08 |
| 2021/0142253 A1* | 5/2021 | Cohen | ............... | G06Q 30/0202 |
| 2021/0350278 A1* | 11/2021 | Malladi | ............. | G06Q 10/0631 |
| 2022/0093249 A1* | 3/2022 | Sharma | ............... | G06N 3/0455 |
| 2022/0245653 A1* | 8/2022 | Bai | ................... | G06Q 30/0204 |
| 2025/0111514 A1* | 4/2025 | Shiroishi | ............... | A61B 6/504 |
| 2025/0131459 A1* | 4/2025 | Saha | ................. | G06Q 30/0201 |

OTHER PUBLICATIONS

X. Zhang, F. Yuan, Y. Cao and S. Liu, "Reservation Enhanced Autonomous Valet Parking Concerning Practicality Issues," in IEEE Systems Journal, vol. 16, No. 1, pp. 351-361, Mar. 2022, (Year: 2022).*

Sharma, A. et al., Causal Reasoning: Fundamentals and Machine Learning Applications. Retrieved from: https://causalinference.gitlab.io/causal-reasoning-book-chapter1/ 2019.

More, S. et al., (2023). Double Machine Learning at Scale to Predict Causal Impact of Customer Actions. 10.48550/arXiv.2409.02332. Sep. 17, 2023.

Ali, O. et al., Personalized choice model for forecasting demand under pricing scenarios with observational data-The case of attended home delivery. Retrieved from: https://www.sciencedirect.com/science/article/abs/pii/S0169207023000444 2023.

* cited by examiner

300

400

500

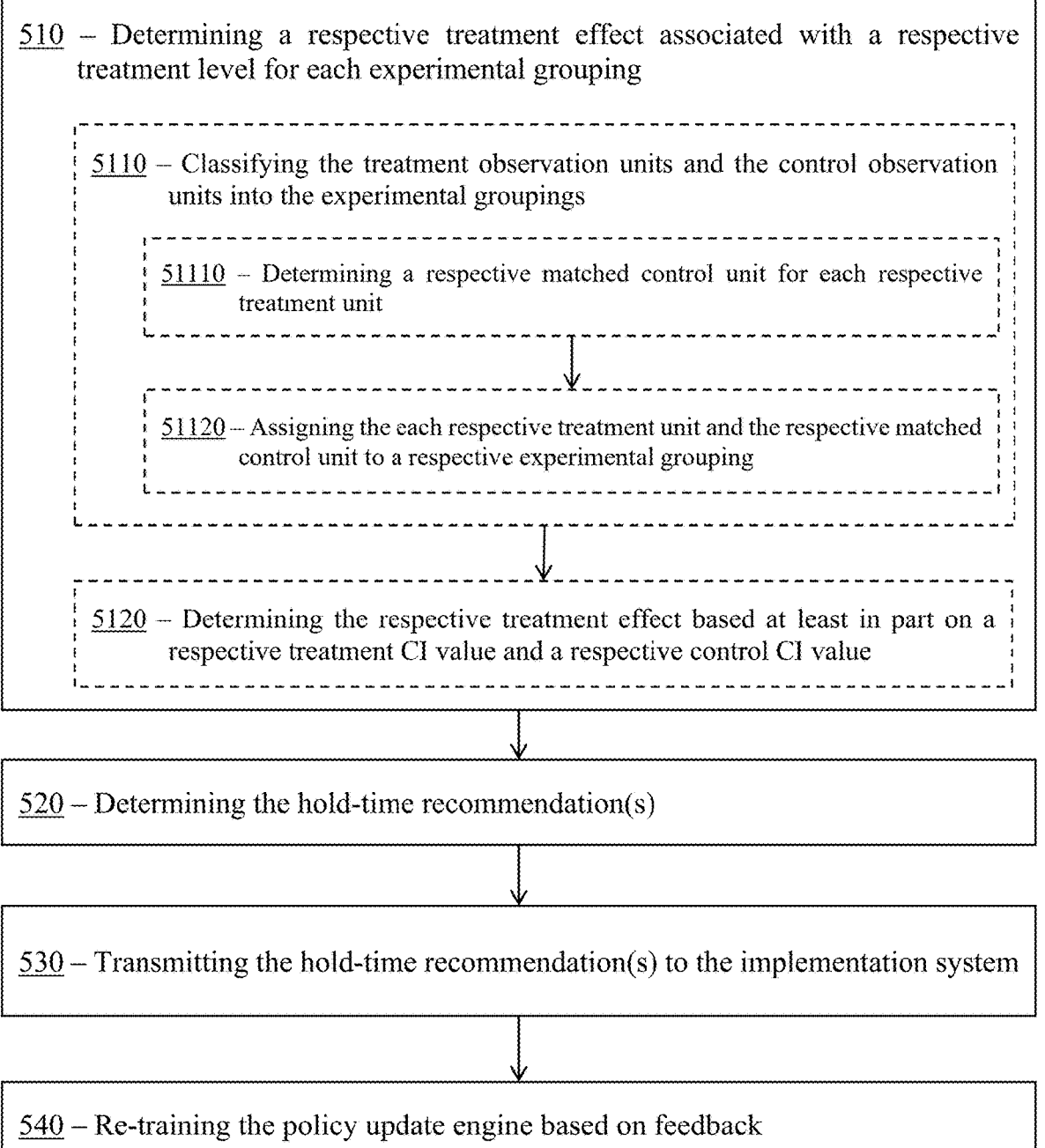

510 – Determining a respective treatment effect associated with a respective treatment level for each experimental grouping 5110 – Classifying the treatment observation units and the control observation units into the experimental groupings 51110 – Determining a respective matched control unit for each respective treatment unit 51120 – Assigning the each respective treatment unit and the respective matched control unit to a respective experimental grouping 5120 – Determining the respective treatment effect based at least in part on a respective treatment CI value and a respective control CI value 520 – Determining the hold-time recommendation(s)

530 – Transmitting the hold-time recommendation(s) to the implementation system

540 – Re-training the policy update engine based on feedback

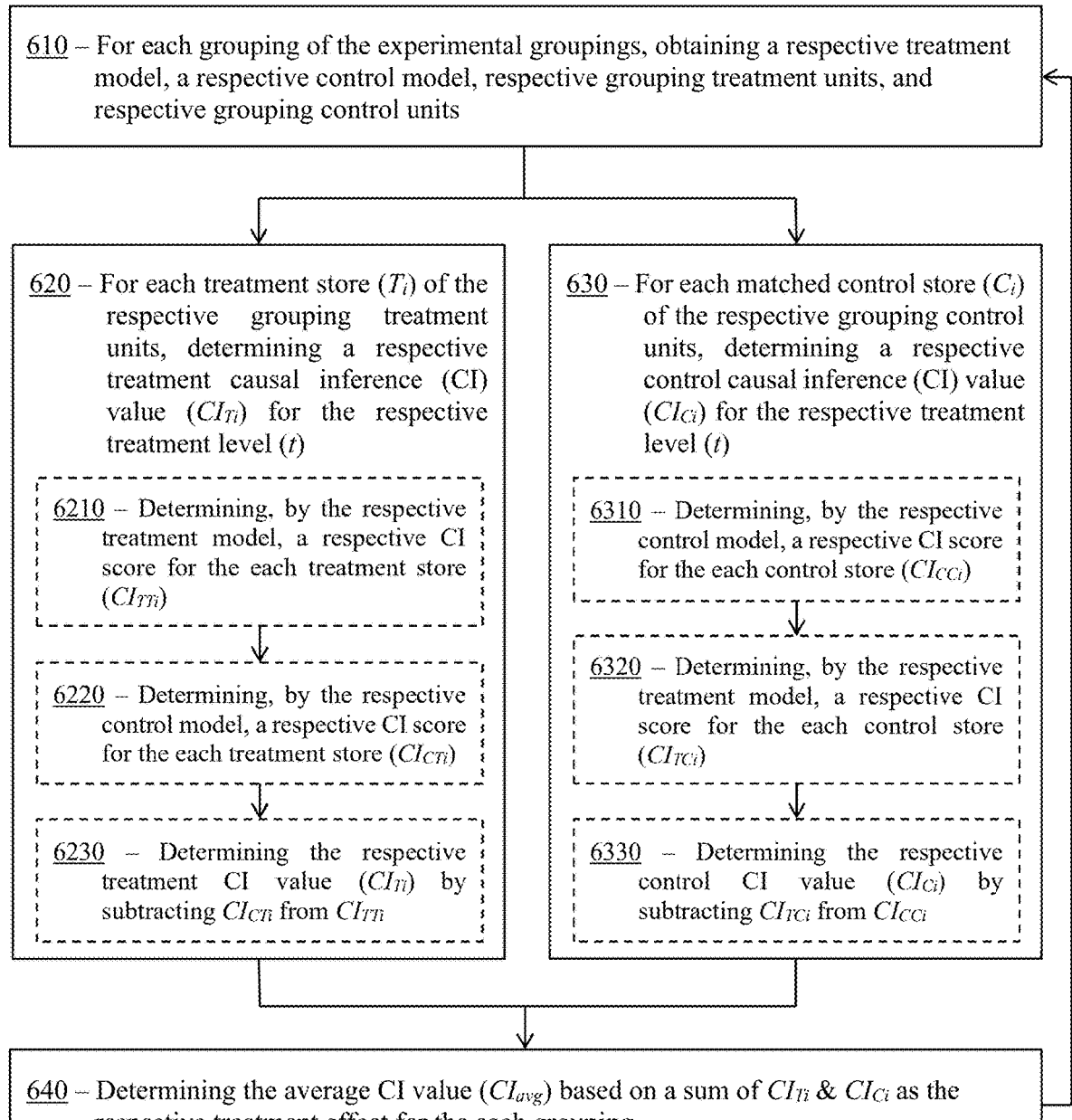

610 – For each grouping of the experimental groupings, obtaining a respective treatment model, a respective control model, respective grouping treatment units, and respective grouping control units 620 – For each treatment store ($T_i$) of the respective grouping treatment units, determining a respective treatment causal inference (CI) value ($CI_{Ti}$) for the respective treatment level ($t$)

6210 – Determining, by the respective treatment model, a respective CI score for the each treatment store ($CI_{TTi}$)

6220 – Determining, by the respective control model, a respective CI score for the each treatment store ($CI_{CTi}$)

6230 – Determining the respective treatment CI value ($CI_{Ti}$) by subtracting $CI_{CTi}$ from $CI_{TTi}$ 630 – For each matched control store ($C_i$) of the respective grouping control units, determining a respective control causal inference (CI) value ($CI_{Ci}$) for the respective treatment level ($t$)

6310 – Determining, by the respective control model, a respective CI score for the each control store ($CI_{CCi}$)

6320 – Determining, by the respective treatment model, a respective CI score for the each control store ($CI_{TCi}$)

6330 – Determining the respective control CI value ($CI_{Ci}$) by subtracting $CI_{TCi}$ from $CI_{CCi}$ 640 – Determining the average CI value ($CI_{avg}$) based on a sum of $CI_{Ti}$ & $CI_{Ci}$ as the respective treatment effect for the each grouping

FIG. 6

An estimated cumulative reward (vπ(s)) for a policy (π, a hold-time treatment level):

$$v_{\pi}(s) = \mathbb{E}\left[R_{t+1} + \gamma R_{t+2} + \ldots | S_t = s\right]$$

where $R_{t+i}$ comprises a respective reward (e.g., a hold-time causal inference value, estimated increased purchases or GMV) for transitioning from state $S_{t+i-1}$ to state $S_{t+i}$ ($s$: starting state; $1 \leq i \leq N$) from timestep $t$; and $\gamma$ comprises a respective discount rate between zero and one, that can be the same or different (e.g., decreasing or increasing) for all of the respective rewards ($R_{t+1}$, $R_{t+2}$, $R_{t+3}$, ... $R_{t+N}$) over a period of time defined by the $N$ timesteps.

FIG. 7

SYSTEM AND METHOD FOR DYNAMICALLY DETERMINING RESOURCE-HOLD-TIME RECOMMENDATIONS BASED ON ESTIMATED CAUSAL EFFECTS

TECHNICAL FIELD

This disclosure relates generally to techniques for optimizing recommendations.

BACKGROUND

Retailers seek to make the best use of their resources (e.g., a delivery fleet, store or curb pickup time slots, items in the inventory, etc.). A retailer generally would only allow a user of the retailer's online platform to temporarily hold a reservation of a resource (e.g., an item, a delivery or pickup time slot, etc.) for a limited period of time so that the valuable resource can be released to someone else who is ready to check out. Many factors (e.g., timing such as holiday seasons, weekends, or weekdays; how busy the retailer is; average user behaviors; the impact of the hold time on the user's shopping experience; etc.) may affect the optimal delivery slot hold time value in terms of the volume or value of sales. Thus, systems and methods for dynamically determining a recommended hold time are desired.

BRIEF DESCRIPTION OF THE DRAWINGS

To facilitate further description of the embodiments, the following drawings are provided in which:

FIG. 5 illustrates a flow chart for a method of dynamically generating one or more recommended hold-time values, according to an embodiment;

FIG. 6 illustrates a flow chart for a method of determining the treatment effect associated with a treatment level, according to an embodiment; and FIG. 7 illustrates an exemplary state-value function for evaluating an estimated cumulative reward for a policy, according to an embodiment.

Figure 1:
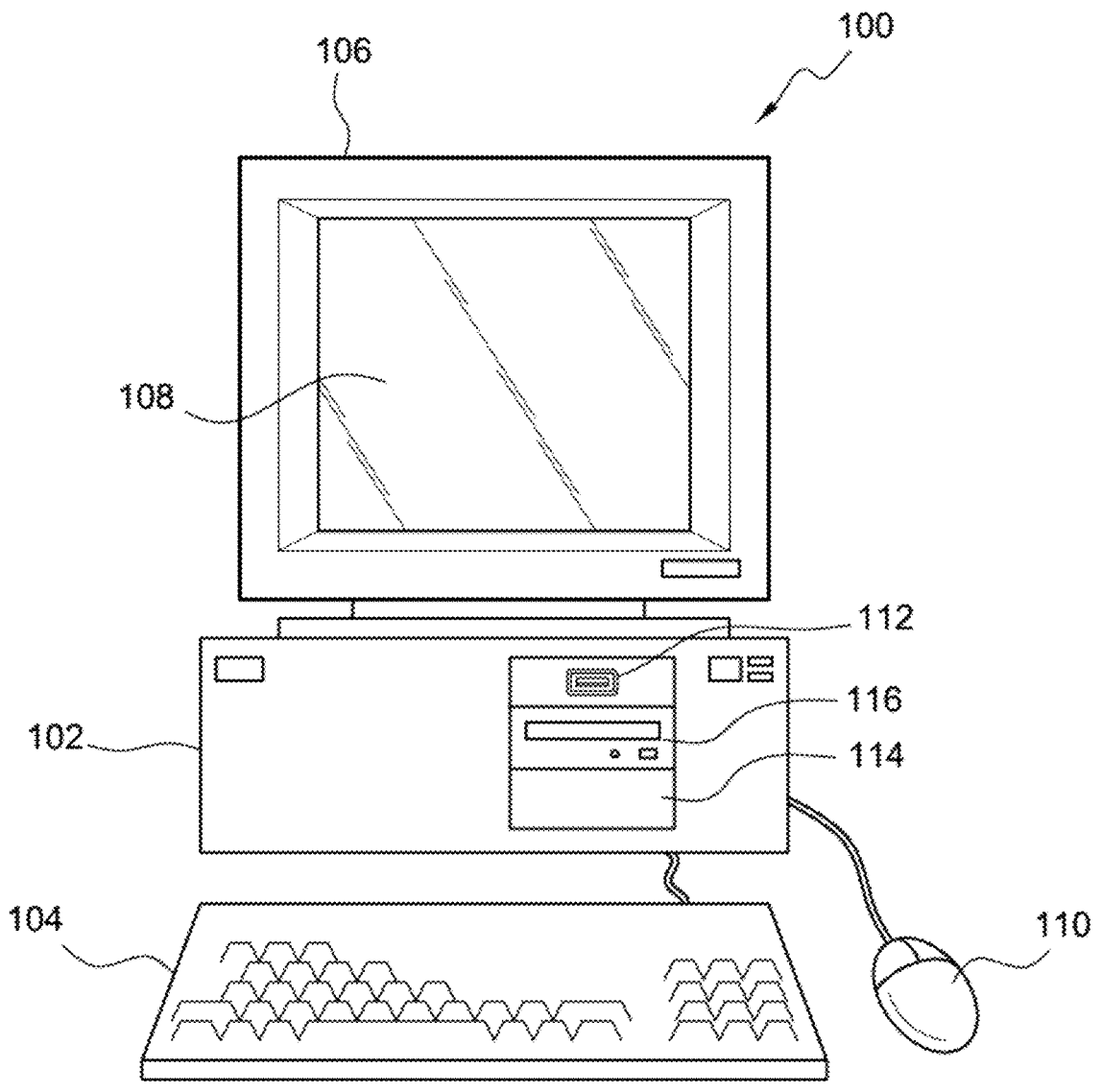
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
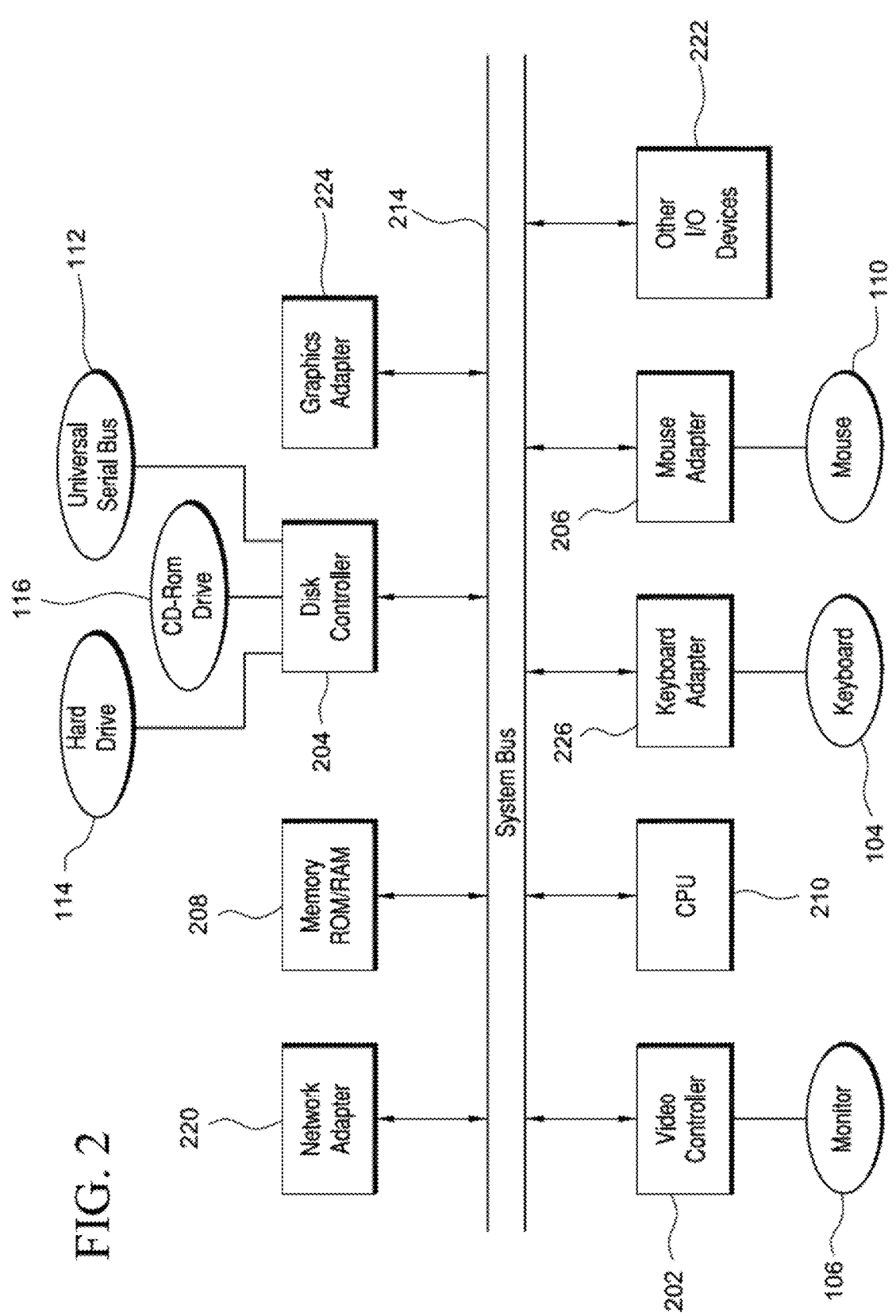
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIG. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICS.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
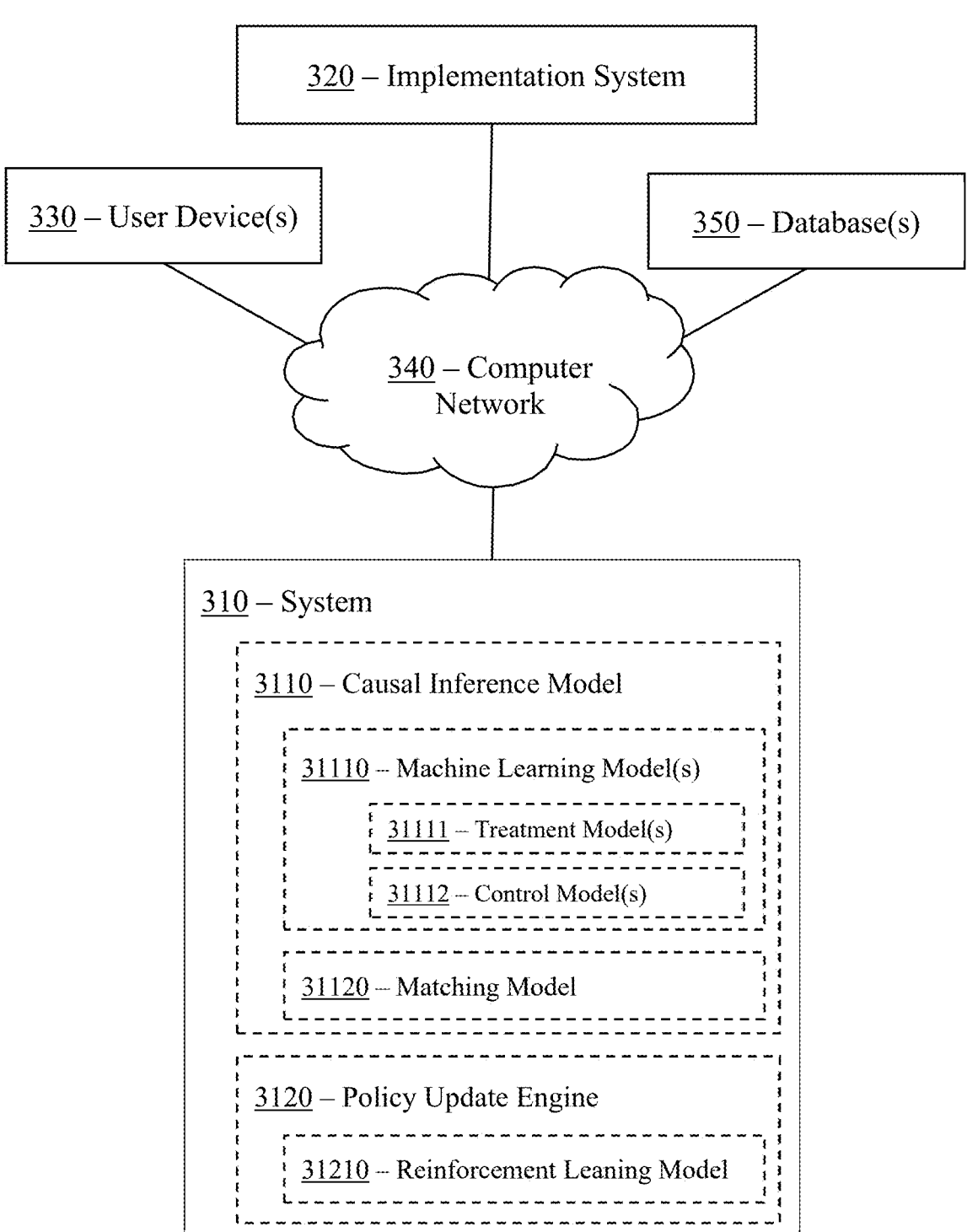
FIG. 3 illustrates a system for dynamically determining recommendations based on estimated causal effects and/or implementing the recommendations, according to an embodiment.

Turning ahead in the drawings, FIG. 3 illustrates a block diagram of a system 300 that can be employed for dynamically determining one or more recommended values based on estimated causal effects and/or using the one or more recommended values, as determined, according to an embodiment. System 300 is merely exemplary and embodiments of the system are not limited to the embodiments presented herein. The system can be employed in many different embodiments or examples not specifically depicted or described herein. In a number of embodiments, the system can be used to determine one or more optimal, or near optimal, attributes for an implementation system (e.g., a website, a mobile application server, a back-end server, etc.). For example, the system can determine a recommended hold-time value at or during a certain time period (e.g., a specific month, two weeks before Valentine's Day, Black Friday, the entire holiday season of a year, etc.) for an online retailer's e-commerce platform that allows users to shop and schedule deliveries from all or some of the retailer's stores and/or warehouses. The quality of a generated hold-time value can be measured by the observed or estimated effects (e.g., an increase in the quantity and/or value of orders) after the hold-time value is adopted. In several embodiments, the system can be used to dynamically determine a hold-time recommendation for deliveries from some of the retailer's stores or warehouses. In certain embodiments, the system can be used to determine the hold-time recommendation(s) for a single user or a group of users in a geographic area. In similar or different embodiments, the system can be used to determine one or more recommendations of non-hold-time attributes of a platform (e.g., a session time-out value, a quantity or frequency of item recommendations, etc.).

In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein. In many embodiments, operators and/or administrators of system 300 can manage system 300, the processor(s) of system 300, and/or the memory storage unit(s) of system 300 using the input device(s) and/or display device(s) of system 300, or portions thereof in each case.

Referring to FIG. 3, in many embodiments, system 300 can include a system 310, an implementation system 320, a user device(s) 330, and/or a database(s) 350. System 310 further can include one or more elements, modules, models, or systems, such as a causal inference model 3110, a machine learning model(s) 31110, a treatment model(s) 31111, a control model(s) 31112, a matching model 31120, a policy update engine 3120, a reinforcement learning model 31210, etc., to perform various procedures, processes, and/or activities of system 300 and/or system 310. Each of causal inference model 3110, machine learning model(s) 31110, treatment model(s) 31111, control model(s) 31112, matching model 31120, policy update engine 3120, and/or reinforcement learning model 31210 can include one or more functions, algorithms, modules, models, and/or systems and can be pre-trained or re-trained.

System 310, implementation system 320, user device(s) 330, causal inference model 3110, machine learning model(s) 31110, treatment model(s) 31111, control model(s) 31112, matching model 31120, policy update engine 3120, and/or reinforcement learning model 31210 can each be a computer system, such as computer system 100 (FIG. 1), as described above, and can each be a single computer, a single server, or a cluster or collection of computers or servers, or a cloud of computers or servers. In another embodiment, a single computer system can host system 310, implementation system 320, user device(s) 330, causal inference model 3110, machine learning model(s) 31110, treatment model(s) 31111, control model(s) 31112, matching model 31120, policy update engine 3120, and/or reinforcement learning model 31210. Additional details regarding system 310, implementation system 320, user device(s) 330, causal inference model 3110, machine learning model(s) 31110, treatment model(s) 31111, control model(s) 31112, matching model 31120, policy update engine 3120, and/or reinforcement learning model 31210 are described herein.

In many embodiments, system 310 can be in data communication with implementation system 320, using a computer network (e.g., computer network 340), such as the Internet and/or an internal network that is not open to the public. In some embodiments, an internal network (e.g., computer network 340) that is not open to the public can be used for communications between system 310 and implementation system 320 within system 300. In several embodiments, system 310 can include system 320, or vice versa.

In some embodiments, system 310 and/or implementation system 320 can be in data communication with user device(s) 330, using a computer network (e.g., computer network 340), such as the Internet and/or an internal network that is not open to the public. In some embodiments, user device(s) 330 can be used by users, such as users for an online retailer's websites, customers or potential customers for a retailer, and/or a system operator or administrator (e.g., a machine learning engineer or a data scientist) for system 310 and/or implementation system 320. In a number of embodiments, system 320 can host one or more websites and/or mobile application servers. For example, system 320 can host a website, or provide a server that interfaces with an application (e.g., a mobile application or a web browser), on user device(s) 330, which can allow users to browse, search, and/or order products, and/or schedule order deliveries, in addition to other suitable activities. In some embodiments, an internal network (e.g., computer network 340) that is not open to the public can be used for communications between or among system 310, implementation system 320, and/or user device(s) 330 within system 300.

In certain embodiments, the user devices (e.g., user device(s) 330) can be a mobile device, and/or other endpoint devices used by one or more users. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device (e.g., smart glasses, smart watches, an augmented-reality (AR) headset, a virtual-reality (VR) headset, etc.), or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with and/or include a database(s) 350. In certain embodiments, database(s) 350 can include a product catalog of a retailer that contains information about products, items, or SKUs (stock keeping units), for example, among other data as described herein. In another example, database(s) 350 can include store features and/or feature embeddings of a store-based retailer that contains information about the stores' locations (e.g., urban, semi-urban or rural settings), time of the year/month, ongoing or upcoming sales events and holiday periods, weather information and forecast, supply-chain network information including the inbound and outbound volumes, daily sales, orders delivered per day, for example, among other data as described herein. In several embodiments, database(s) 350 further can include training data (e.g., synthetic training data, historical input/output data, tags for the synthetic and/or historical data, historical effects of the outputs, user or system feedback, etc.) and/or hyper-parameters for training and/or configuring system 310, causal inference model 3110, machine learning model(s) 31110, treatment model(s) 31111, control model(s) 31112, matching model 31120, policy update engine 3120, and/or reinforcement learning model 31210. The one or more databases further can include a user profile database that contains user profiles, including information such as account data, billing or shipping addresses, payment methods, historical transaction data, etc.

In a number of embodiments, database(s) 350 can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more data sources, that particular database can be stored on a single memory storage unit or the contents of that particular database can be spread across multiple ones of the memory storage units storing the one or more databases, depending on the size of the particular database and/or the storage capacity of the memory storage units. In similar or different embodiments, the one or more data sources can each be a computer system, such as computer system 100 (FIG. 1), as described above, and can each be a single computer, a single server, or a cluster or collection of computers or servers, or a cloud of computers or servers.

Database(s) 350 can include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, communication between system 310, implementation system 320, user device(s) 330, database(s) 350, causal inference model 3110, machine learning model(s) 31110, treatment model(s) 31111, control model(s) 31112, matching model 31120, policy update engine 3120, and/or reinforcement learning model 31210 can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc.

The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Still referring to FIG. 3, system 310 can dynamically generate recommended values (e.g., recommended delivery slot hold-time values) based on estimated causal effects. System 310 can generate recommended values for various attributes of implementation system 320. In many embodiments, system 310 can determine, by a causal inference model (e.g., causal inference model 3110), a respective treatment effect (e.g., an estimated increase in the quantity of orders in a period of time, Gross Merchandise Value (GMV), etc.) associated with a respective hold-time treatment level (e.g., 5 minutes, 10 minutes, or 30 minutes, etc.) for each grouping of one or more experimental groupings (e.g., 2, 5, or 10 groupings of a respective experimental group and a respective control group). System 310 further can determine, by a policy update engine (e.g., policy update engine 3120), one or more hold-time recommendations based at least in part on the respective treatment effect associated with the respective hold-time treatment level for each grouping of the one or more experimental groupings, as determined by causal inference model 3110. Moreover, system 310 can transmit the one or more hold-time recommendations to an implementation system (e.g., implementation system 320) to cause an implementation of one or more hold-time values of the one or more hold-time recommendations. Additionally, after receiving the one or more effects of the implementation from implementation system 320, system 310 can re-train policy update engine 3120 based at least in part on one or more effects of the implementation and the one or more hold-time values.

In a number of embodiments, to determine the respective treatment level for the each grouping, system 310 further can: (a) classify treatment observation units in a treatment population and control observation units in a control population into the one or more experimental groupings; and (b) determine or predict, by one or more respective machine learning models (e.g., machine learning model(s) 31110, treatment model(s) 31111, control model(s) 31112, etc.), the respective treatment effect for the each grouping. In an e-commerce scenario, examples of the treatment observation units and the control observation units can include subsets of the stores for delivering orders or users of a store-based retailer.

In some embodiments, system 310 can classify the treatment observation units and the control observation units by: (a) determining, by a matching model (e.g., matching model 31120), a respective similarity level between the each respective treatment unit and the respective matched control unit; (b) determining a respective matched control unit of the control observation units for each respective treatment unit of the treatment observation units based on a respective similarity level between the each respective treatment unit and the respective matched control unit; and (c) assigning the each respective treatment unit and the respective matched control unit to a respective grouping of the one or more experimental groupings based on the respective similarity level and a respective threshold associated with the respective grouping.

The matching model (e.g., matching model 31120) can determine the respective similarity level based on any suitable statistic-based and/or machine-learning models or algorithms. For example, in some embodiments, matching model 31120 can perform stratification by recursive partitioning based on one or more respective features or covariates (e.g., a store's sales volumes, a store's or a user's geographic areas, a user's purchase history, etc.) stored in database(s) 350 for the each respective treatment unit (e.g., a store or a user) and the respective matched control unit (e.g., another store or user similar to the each respective treatment unit). In similar or different embodiments, matching model 31120 can determine the respective similarity level based on a respective cosine distance between respective feature embeddings (e.g., feature embeddings stored in database(s) 350 or generated by one hot encoding, word2vec, TF-IDF, FastText, etc.) for the each respective treatment unit and the respective matched control unit. In several embodiments, matching model 31120 can use propensity score matching based on the one or more respective features for the each respective treatment unit and the respective matched control unit. For example, matching model 31120 can determine the respective conditional probability of treatments of the each respective treatment unit and the respective matched control unit based on the one or more respective features. Then, matching model 31120 further can determine the respective similarity level based on the respective conditional probability of treatments computed using one or more of the respective features.

In many embodiments, causal inference model 3110 can include any suitable machine learning model or models (e.g., linear regression, logistic regression, random forest, neural networks, XGBoost, etc.) that are pre-trained or trained to determine the respective treatment effect associated with the respective hold-time treatment level for each grouping of the one or more experimental groupings. In some embodiments, system 310 further can train causal inference model 3110 once or periodically to determine the respective treatment effect. In similar or different models, causal inference model 3110, machine learning model(s) 31110, treatment model(s) 31111, control model(s) 31112, and matching model 31120 can be pre-trained.

In a number of embodiments, training causal inference model 3110 can include training one or more of the components of causal inference model 3110 (e.g., machine learning model(s) 31110, treatment model(s) 31111, control model(s) 31112, and/or matching model 31120). In some embodiments, after assigning the each respective treatment unit and the respective matched control unit to the respective grouping, system 310 further can: (a) train treatment model(s) 31111 for a respective treatment group of each grouping of the one or more experimental groupings based on the one or more respective grouping treatment units of the respective treatment group to determine a respective treatment causal inference value associated with a treatment level; and/or (b) train control model(s) 31112 for a respective control group of each grouping of the one or more experimental groupings based on one or more respective grouping control units of the respective control group to determine a respective control causal inference value associated with a non-treatment level.

Still referring to FIG. 3, in many embodiments, system 310 can include a feedback loop for optimizing hold-time recommendations. For example, after the one or more hold-time values of the one or more hold-time recommendations have been implemented by implementation system 320 or a frond-end system (e.g., an online retailer platform) for a predetermined period of time (e.g., 5 days, 2 weeks, a month, 2 months, etc.), system 310 further can re-determine, by policy update engine 3120, the one or more hold-time recommendations based at least in part on the one or more effects (e.g., the increase or decrease in GMV or orders) observed by and/or received from implementation system 320 and the one or more hold-time values transmitted to implementation system 320.

In a few embodiments, implementation system 320 can include one or more elements, models, and/or systems configured to: (a) selectively determine one or more attributes to be implemented based on the one or more recommendations received from system 310 and/or (b) observe or determine the one or more effects of implementing the one or more attributes, as determined. In some embodiments, implementation system 320 can selectively determine one or more of the one or more hold-time recommendations as the one or more hold-time values, based on any suitable rules or criteria. For example, implementation system 320 can adopt all of the one or more hold-time recommendations as the one or more hold-time values. In another example, implementation system 320 can randomly select one or more of the one or more hold-time recommendations as the one or more hold-time values. In yet another example, implementation system 320 can choose one of the one or more hold-time recommendations to be implemented on the target (e.g., an individual store or user, a group of stores or users, etc.) based on the target's features.

In a number of embodiments, causal inference model 3110 can be part of the feedback loop, and system 310 further can re-train causal inference model 3110 based at least in part on the one or more hold-time recommendations, as re-determined by policy update engine 3120. System 310 also can re-determine, by causal inference model 3110, the respective treatment effect associated with the one or more hold-time recommendations, as re-determined by policy update engine 3120, for each grouping of the one or more experimental groupings for policy update engine 3120 to iteratively re-determine the one or more hold-time recommendations.

In many embodiments, the respective treatment causal inference values associated with the respective hold-time treatment level for each grouping of the one or more experimental groupings can be determined based on: (a) a respective treatment causal inference value associated with the respective hold-time treatment level for each respective treatment unit of the one or more respective grouping treatment units for the each grouping, and (b) the respective control causal inference value associated with the respective hold-time treatment level for a respective matched control unit of the one or more respective grouping control units for the each group. For example, the respective treatment causal inference values associated with the respective hold-time treatment level for each grouping can include one or more of: (a) the respective treatment causal inference value for each respective treatment unit for the each grouping, (b) the respective control causal inference value for each respective control unit for the each grouping, (c) a sum of the respective treatment causal inference value and the respective control causal inference value, and/or (d) an average of the respective treatment causal inference value and the respective control causal inference value, etc.

In some embodiments, system 310 additionally can determine, by machine learning model(s) 31110, the respective treatment causal inference value of the one or more respective causal inference values associated with the respective hold-time treatment level for each respective treatment unit of the one or more respective grouping treatment units for the each grouping. In a number of embodiments, the respective treatment causal inference value of the one or more respective causal inference values for each respective treatment unit of the one or more respective grouping treatment units for the each grouping can be determined by: (a) determining, by treatment model(s) 31111, a respective first causal inference score for the each respective treatment unit; (b) determining, by control model(s) 31112, a respective second causal inference score for the each respective treatment unit; and (c) determining the respective treatment causal inference value by subtracting the respective second causal inference score from the respective first causal inference score.

In a number of embodiments, system 310 also can determine, by machine learning model(s) 31110, the respective control causal inference value of the one or more respective causal inference values for the respective matched control unit of the one or more respective grouping control units for the each grouping. In many embodiments, the respective control causal inference value of the one or more respective causal inference values for the respective matched control unit for the each group can be determined by: (a) determining, by control model(s) 31112, a respective third causal inference score for the each respective control unit; (b) determining, by treatment model(s) 31111, a respective third fourth causal inference score for the each respective control unit; and (c) determining the respective control causal inference value by subtracting the respective fourth causal inference score from the respective third causal inference score.

In several embodiments, system 310 further can determine, as the respective treatment effect for the each grouping, an average value of the respective treatment causal inference value for each respective treatment unit of the one or more respective grouping treatment units and the respective control causal inference value for the respective matched control unit of the one or more respective grouping control units.

In some embodiments, policy update engine 3120 can include a reinforcement learning model (e.g., reinforcement leaning model 31210) trained by policy iteration. In certain embodiments, to determine the one or more hold-time recommendations, policy update engine 3120 can perform the following activities iteratively until convergence is reached: (a) evaluate the respective hold-time treatment level for each grouping of the one or more experimental groupings; and (b) updating the respective hold-time treatment level by a greedy function with the respective estimated reward. The respective hold-time treatment level for the each grouping can be determined based on a respective estimated reward determined by any suitable state-value function with the respective treatment effect associated with the respective hold-time treatment level for each grouping of the one or more experimental groupings. An exemplary state-value function for evaluating an estimated cumulative reward for a policy is described in FIG. 7.

Figure 4:
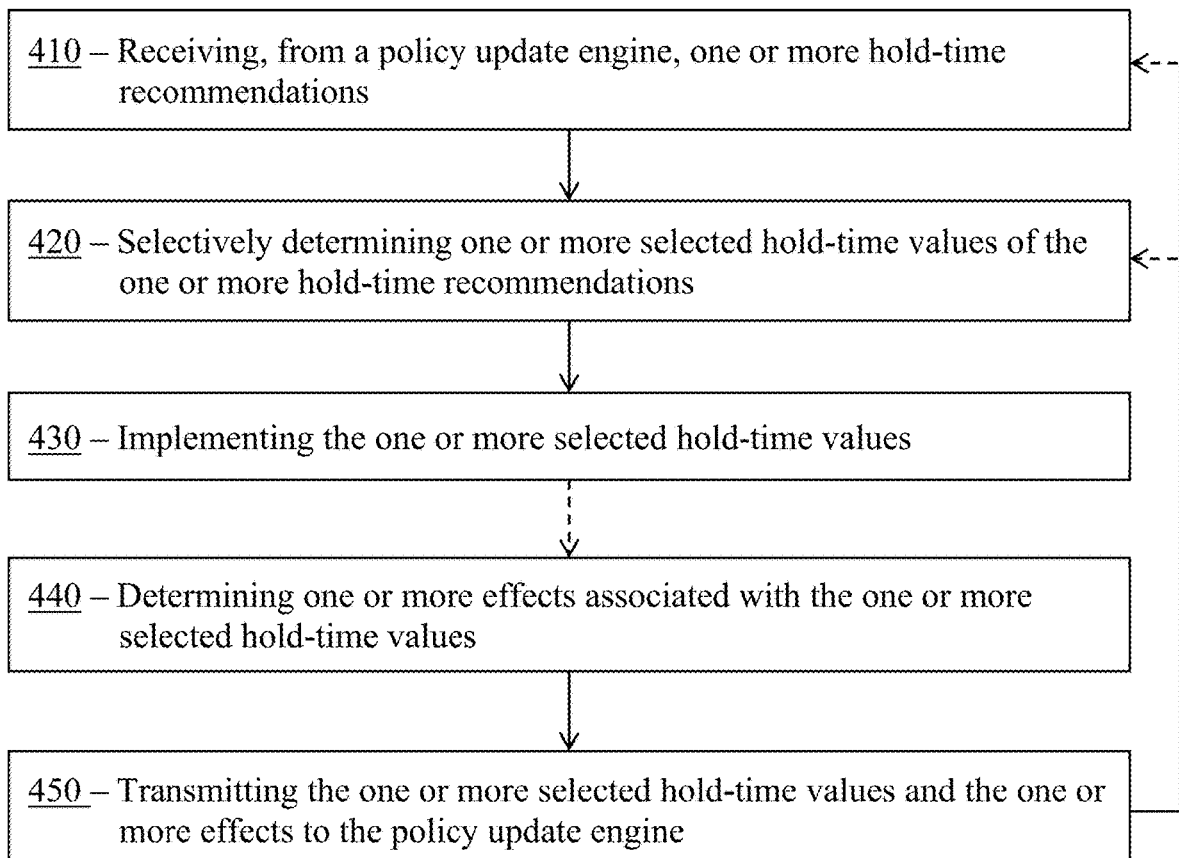
FIG. 4 illustrates a flow chart for a method of dynamically updating a hold-time for a resource based on one or more recommendations, according to an embodiment.

Turning to FIG. 4, a flow chart is illustrated for a method 400 of dynamically updating a hold-time for a resource based on one or more recommendation, according to an embodiment. Method 400 is merely exemplary and is not limited to the embodiments presented herein. Method 400 can be employed in many different embodiments or examples not specifically depicted or described herein. For example, method 400 can be adopted to dynamically reducing a hold-time value for delivery time slots at an e-commerce platform during the weekends or Christmas shopping season and increasing the hold-time value or returning to the previous hold-time value for delivery time slots during the weekdays or after the shopping season. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), system 310 (FIG. 3) (including one or more of its elements, modules, models, and/or systems, such as causal inference model 3110 (FIG. 3), machine learning model(s) 31110 (FIG. 3), treatment model(s) 31111 (FIG. 3), control model(s) 31112 (FIG. 3), matching model 31120 (FIG. 3), policy update engine 3120 (FIG. 3), and/or reinforcement learning model 31210 (FIG. 3), etc.), and/or implementation system 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), or implementation system 320 (FIG. 3). The processor(s) can be similar or identical to the processor(s) described above with respect to computer system 100 (FIG. 1).

Referring to FIG. 4, method 400 can include a block 410 of receiving, from a policy update engine, one or more hold-time recommendations. In many embodiments, the policy update engine (e.g., policy update engine 3120 (FIG. 3)) can be trained and/or configured to determine the one or more hold-time recommendations for various resources (e.g., an order delivery or pick-up time slot, an item added to a cart, an active session with a server, etc.) based at least in part on a respective treatment effect associated with a respective hold-time treatment level (e.g., an experimental hold-time value, an experimental hold-time increment or decrement, etc.) for each grouping of one or more experimental groupings. Each grouping of the one or more experimental groupings can include one or more respective grouping treatment units of treatment observation units (e.g., retail stores, websites, users of a system, etc.) and one or more respective grouping control units of control observation units assigned to the each grouping based on a respective threshold and a respective similarity level between each respective pair of the one or more respective grouping treatment units and the one or more respective grouping control units. In some embodiments, the respective hold-time treatment level for each grouping of the one or more experimental groupings can be determined by a causal inference model (e.g., causal inference model 3110 (FIG. 3)). An exemplary method for dynamically generating the one or more hold-time recommendations is described in FIG. 5.

In many embodiments, method 400 further can include a block 420 of selectively determining one or more selected hold-time values of the one or more hold-time recommendations, received in block 410. Block 420 can determine the one or more selected hold-time values based on any suitable criteria and/or rules. For example, block 420 can choose the one or more selected hold-time values randomly from the one or more hold-time recommendations. In a few embodiments, block 420 can choose the one or more selected hold-time values based on the hold-time value(s) currently used at an implementation system (e.g., implementation system 320 (FIG. 3)). For example, the one or more selected hold-time values can be a predetermined quantity (e.g., 1, 2, 3, etc.) of values closest to the current hold-time value(s) or those within a predetermine hold-time value range. In certain embodiments, block 420 can accept all of the one or more hold-time recommendations from the policy update engine as the one or more selected hold-time values.

In a number of embodiments, method 400 also can include a block 430 of implementing the one or more selected hold-time values. In many embodiments, block 430 can be performed by an implementation system (e.g., implementation system 320 (FIG. 3), an e-commerce platform, a website, etc.) immediately or at a scheduled time (e.g., an immediately following midnight, 24 hours, 3 business days, or the following weekend, etc.) after determining the one or more selected hold-time values in block 420. In a number of embodiments, block 430 can be performed during a predetermined time period (e.g., 3 weeks from the beginning of block 430, 2 weeks before Thanksgiving until Christmas, a week before until 3 days after Black Friday, etc.) or until receiving new hold-time recommendations from the policy update engine.

In certain embodiments, the one or more selected hold-time values implemented at block 430 can be displayed on a user device (e.g., user device(s) 330 (FIG. 3)) to make the user aware of the time limit(s). For example, in an embodiment, when a selected hold-time value of an e-commerce website is a delivery slot hold-time value (e.g., 30 minutes), the user device can display, on a webpage, an expected expiration time (or a remaining time of the delivery slot hold time) before or after the user selects a desired time slot. If the user continues browsing the website without checking out before the delivery slot hold time expires, the desired time slot can be released, and the user can be notified immediately or at the check-out webpage.

In many embodiments, method 400 additionally can include a block 440 of determining one or more effects associated with the one or more selected hold-time values. Examples of the one or more effects can include the increase or decrease in user engagement, the quantity of orders, GMV, etc. that are observed or obtained while the one or more selected hold-time values are implemented. In many embodiments, block 430 and block 440 can be performed at least in part concurrently or sequentially by the same system or server (e.g., implementation system 320 (FIG. 3)) or by different systems and/or servers (e.g., implementation system 320 (FIG. 3), an order management system, and/or a front-end system, etc.).

In some embodiments, method 400 further can include a block 450 of transmitting the one or more selected hold-time values and the one or more effects to the policy update engine. In many embodiments, the policy update engine can use the feedback from block 450 (e.g., the one or more selected hold-time values and the one or more effects) for re-training and/or re-configuring the policy update engine and/or the causal inference model. In a number of embodiments, after the one or more selected hold-time values and the one or more effects are transmitted in the block 450, method 400 can restart at block 410 or block 420.

Continuing with the drawings, FIG. 5 illustrates a flow chart for a method 500 of dynamically determining hold-time recommendations, according to an embodiment. Method 500 is merely exemplary and is not limited to the embodiments presented herein. Method 500 can be employed in many different embodiments or examples not specifically depicted or described herein. In some embodiments, method 500 can be adopted by method 400 (FIG. 4), block 410 (FIG. 4), or block 4110 (FIG. 4). In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3) or system 310 (FIG. 3) (including one or more of its elements, modules, models, and/or systems, such as causal inference model 3110 (FIG. 3), machine learning model(s) 31110 (FIG. 3), treatment model(s) 31111 (FIG. 3), control model(s) 31112 (FIG. 3), matching model 31120 (FIG. 3), policy update engine 3120 (FIG. 3), and/or reinforcement learning model 31210 (FIG. 3), etc.) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

Referring to FIG. 5, method 500 can include a block 510 of determining, by a causal inference model (e.g., causal inference model 3110 (FIG. 3)), a respective treatment effect associated with a respective treatment level (e.g., 5 minutes, 10 minutes, 30 minutes, 45 minutes, etc.) for each experimental grouping of one or more experimental groupings. In some embodiments, the each experimental grouping can be associated with a respective threshold or range (e.g., 0.2, 0.4, 0.6, 0.8, or 1.0; or [0, 33%), [33%, 66%), or [66%, 100%], etc.). In many embodiments, block 510 can include a block 5110 of classifying the treatment observation units (e.g., one or more stores of a store-based retailer, or one or more users, etc.) in a treatment population and the control observation units in a control population into the experimental groupings.

In a number of embodiments, block 5110 further can include a block 51110 of determining, via a matching model (e.g., matching model 31120 (FIG. 3)), a respective matched control unit of the control observation units for each respective treatment unit of the treatment observation units. In many embodiments, the respective matched control unit matched with a first treatment unit can also be matched with a second treatment unit. Block 51110 can determine the respective matched control unit for the each respective treatment unit by any suitable approaches. In some embodiments, block 51110 can determine the respective matched control unit for the each respective treatment unit based on a respective similarity level between the each respective treatment unit and the respective matched control unit based on the one or more respective features and/or feature embeddings for the each respective treatment unit and the respective matched control unit. The respective similarity level can be determined by any suitable algorithms or models, such as recursive partitioning, a respective cosine distance between the respective matched control unit and the each respective treatment unit, propensity score matching, etc. In some embodiments, block 5110 also can include a block 51120 of assigning the each respective treatment unit and the respective matched control unit to a respective experimental grouping of the one or more experimental groupings.

In several embodiments, block 510 further can include a block 5120 of determining, by one or more respective machine learning models (e.g., machine learning model(s) 31110 (FIG. 3), treatment model(s) 31111 (FIG. 3), or control model(s) 31112 (FIG. 3), etc.) of the causal inference model (e.g., causal inference model 3110 (FIG. 3)) for each experimental grouping of the one or more experimental groupings, as determined by the causal inference model, the respective treatment effect for the each experimental grouping based at least in part on a respective treatment causal inference (CI) value for each respective treatment unit and a respective control casual inference (CI) value for a respective matched control unit for the each experimental grouping. In a number of embodiments, block 5120 can determine the respective treatment effect for the each experimental grouping by any suitable algorithms.

For example, block 5120 can: (a) determine, by the one or more respective machine learning models, a respective treatment causal inference value of the one or more respective causal inference values for each respective treatment unit of the one or more respective grouping treatment units for the each experimental grouping; (b) determine, by the one or more respective machine learning models, a respective control causal inference value of the one or more respective causal inference values for the respective matched control unit of the one or more respective grouping control units for the each grouping; and (c) determine, as the respective treatment effect for the each grouping, an average value of the respective treatment causal inference value for each respective treatment unit of the one or more respective grouping treatment units and the respective control causal inference value for the respective matched control unit of the one or more respective grouping control units.

In certain embodiments, the one or more respective machine learning models for a first experimental grouping can include one or more first machine learning algorithms (e.g., linear regression, logistic regression, random forest, neural networks, XGBoost, etc.) that are the same or different than the one or more second machine learning algorithms for a second experimental grouping. In a few embodiments, the one or more respective machine learning models for different experimental groupings can be pre-trained or trained based on different training datasets.

In many embodiments, method 500 additionally can include a block 520 of determining, by a policy update engine (e.g., policy update engine 3120 (FIG. 3)), one or more hold-time recommendations based at least in part on the respective treatment effect associated with the respective hold-time treatment level for each grouping of the one or more experimental groupings, as determined by the causal inference model (e.g., causal inference model 3110 (FIG. 3)). In some embodiments, the policy update engine (e.g., policy update engine 3120 (FIG. 3)) can include a reinforcement learning model (e.g., reinforcement learning model 31210 (FIG. 3)) trained by policy iteration.

In a number of embodiments, method 500 further can include a block 530 of transmitting the hold-time recommendation(s) to an implementation system (e.g., implementation system 320 (FIG. 3)) to cause an implementation, by implementation system 320 (FIG. 3), a website, or a server, of one or more hold-time values of the one or more hold-time recommendations. In many embodiments, method 500 also can include a block 540 of re-training the policy update engine (e.g., policy update engine 3120 (FIG. 3)) based on feedback and/or effects (e.g., rewards or regrets in terms of volume of orders or GMV, etc.). The feedback and/or effects can be obtained by and/or received directly or indirectly from implementation system 320 (FIG. 3), the website, or the server that implements the one or more hold-time values.

In a few embodiments, after the policy update engine is re-trained, method 500 further can re-determine, by the policy update engine (e.g., policy update engine 3120 (FIG. 3)), the one or more hold-time recommendations based at least in part on the one or more effects (observed or obtained) and the one or more hold-time values that resulted in the one or more effects during the implementation. After the one or more hold-time recommendations are updated, method 500 further can re-determine, by the causal inference model (e.g., causal inference model 3110 (FIG. 3)), the respective treatment effect associated with the one or more hold-time recommendations, as re-determined by the policy update engine, for each grouping of the one or more experimental groupings for the policy update engine to iteratively re-determine the one or more hold-time recommendations.

In an exemplary embodiment, multiple iterations of method 500 can be implemented to determine an optimal hold-time recommendation. Block 510 can assign 3 stores (Store$_1$, Store$_2$, and Store$_3$) among multiple stores to an experimental grouping (Group$_x$). For example, Store$_1$ can be selected as a control observation unit and matched, at block

51110, with 2 treatment observation units, Store$_2$ and Store$_3$. Then Store$_1$, Store$_2$, and Store$_3$ can be assigned to Group$_x$ at block 51120. In the first iteration of method 500, block 5120 can determine the respective treatment effect based on the respective treatment CI value of each of the treatment stores and the respective control CI value of each of the control stores (e.g., 8 minutes for Store$_1$) in Group$_x$. Based on the respective treatment effect, block 5120 can determine the respective treatment CI value for each of Store$_2$ and/or Store$_3$ of Group$_x$ (e.g., 30 minutes (CI$_{T2}$) and 60 minutes (CI$_{T3}$)) to be provided to block 520 and block 530 to determine whether and where the respective treatment CI value will be implemented. After the respective treatment CI value (e.g., 30 minutes and/or 60 minutes) being transmitted for implementation at the block 530, the respective feedback for the respective treatment CI value for each of Store$_2$ and Store$_3$ can be determined (e.g., an increment of 2.7% and 2.3% in GMV respectively). Then, based on the feedback, block 540 can re-train the policy update engine (e.g., policy update engine 3120 (FIG. 3)) to update the respective treatment CI value for each of Store$_2$ and Store$_3$ of Group$_x$. (e.g., 30 minutes (CI$_{T2}$') and 45 minutes (CI$_{T3}$')). Once the updated treatment CI values are determined, method 500 can be repeated for the next iteration to determine the optimal hold-time recommendation. In many embodiments, method 500 can restart at any suitable block (e.g., block 5110 or 5120 of block 510) with the updated treatment CI values (e.g., CI$_{T2}$' and CI$_{T3}$').

FIG. 6 illustrates a flow chart for a method 600 of determining a respective treatment effect associated with a respective treatment level for each grouping of the experimental groupings, according to an embodiment. Method 600 is merely exemplary and is not limited to the embodiments presented herein. Method 600 can be employed in many different embodiments or examples not specifically depicted or described herein. In some embodiments, method 600 can be adopted by method 400 (FIG. 4), block 410 (FIG. 4), method 500 (FIG. 5), block 510 (FIG. 5), or block 5120 (FIG. 5). In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, system 300 (FIG. 3) or system 310 (FIG. 3) (including one or more of its elements, modules, models, and/or systems, such as causal inference model 3110 (FIG. 3), machine learning model(s) 31110 (FIG. 3), treatment model(s) 31111 (FIG. 3), control model(s) 31112 (FIG. 3), matching model 31120 (FIG. 3), policy update engine 3120 (FIG. 3), and/or reinforcement learning model 31210 (FIG. 3), etc.) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

Referring to FIG. 6, in a number of embodiments, method 600 can include a block 610 of obtaining a respective treatment model (e.g., treatment model(s) 31111 (FIG. 3)), a respective control model (e.g., control model(s) 31112 (FIG.

3)), respective grouping treatment units, and respective grouping control units for each grouping of the experimental groupings. Block 610 further can retrieve, from one or more databases (e.g., database(s) 350 (FIG. 3)), the respective features and/or hyper-parameters of the respective treatment model, the respective control model, the respective grouping treatment units, and the respective grouping control units for each grouping of the experimental groupings. In some embodiments, each respective treatment unit (e.g., each treatment store ($T_i$)) of the respective grouping treatment units for the each grouping can correspond to a respective matched control unit (e.g., each matched control store (Ci)) of the respective grouping control units for the each grouping.

In many embodiments, method 600 further can include a block 620 of determining a respective treatment causal inference (CI) value ($CI_{Ti}$) for a respective treatment level (t) for each treatment store (Ti) of the respective grouping treatment units. In some embodiments, block 620 can include a block 6210 of determining, by the respective treatment model (e.g., machine learning model(s) 31110 (FIG. 3) or treatment model(s) 31111 (FIG. 3), etc.), a respective treatment CI score for the each treatment store ($CI_{TTi}$), based at least in part on one or more of the respective features for the each treatment store. The respective treatment model for the each experimental grouping can include any suitable algorithms (e.g., logistic regression, linear regression, neural networks, random forest, XGBoost, etc.) and can be pre-trained or trained periodically.

In some embodiments, block 620 further can include a block 6220 of determining, by the respective control model (e.g., machine learning model(s) 31110 (FIG. 3) or control model(s) 31112 (FIG. 3)), a respective CI score for the each treatment store ($CI_{CTi}$), based at least in part on one or more of the respective features for the each treatment store. In some embodiments, block 620 further can include a block 6230 of determining the respective treatment CI value ($CI_{Ti}$) by subtracting $CI_{CTi}$ from $CI_{TTi}$. The respective control model for the each experimental grouping can include any suitable algorithms (e.g., logistic regression, linear regression, neural networks, random forest, XGBoost, etc.) and can be pre-trained or trained periodically. In some embodiments, the respective treatment model and the respective control model for the each experimental grouping can include the same algorithms pre-trained or trained based on different training datasets.

In many embodiments, method 600 further can include a block 630 of determining a respective control causal inference (CI) value ($CI_{Ci}$) for the respective treatment level (t) for each matched control store ($C_i$) of the respective grouping control units. In a number of embodiments, block 630 can include a block 6310 of determining, by the respective control model (e.g., machine learning model(s) 31110 (FIG. 3) or control model(s) 31112 (FIG. 3)), a respective CI score for the each control store ($CI_{CCi}$). In a number of embodiments, block 630 further can include a block 6320 of determining, by the respective treatment model (e.g., machine learning model(s) 31110 (FIG. 3) or treatment model(s) 31111 (FIG. 3)), a respective CI score for the each control store ($CI_{TCi}$). In a number of embodiments, block 630 further can include a block 6330 of determining the respective control CI value ($CI_{Ci}$) by subtracting $CI_{TCi}$ from $CI_{CCi}$.

In many embodiments, method 600 further can include a block 640 of determining the average CI value ($CI_{avg}$) based on a sum of $CI_{Ti}$ & $CI_{Ci}$ as the respective treatment effect (TE) for the each grouping. That is, $$TE = CI_{avg} = \frac{1}{N_1 + N_2}\left(\sum_{i=1}^{N_1} CI_{T_i} + \sum_{i=1}^{N_2} CI_{C_i}\right),$$

$N_1$ is the size of the respective grouping treatment units, and $N_2$ is the size of the respective grouping control units. Moreover, method 600 can repeat blocks 610, 620, 630, and 640 until the respective treatment effects of all of the experimental groupings are determined.

Various embodiments can include a system for dynamically updating a hold-time value for a resource based on one or more recommendations. The system can include one or more processors and one or more non-transitory computer-readable media. The one or more non-transitory computer-readable media can store computing instructions configured to, when run on the one or more processors, cause the one or more processors to perform one or more acts. In many embodiments, the one or more acts can include upon receiving, from a policy update engine (e.g., policy update engine 3120 (FIG. 3)), one or more hold-time recommendations, selectively determining, based on one or more selection rules, one or more selected hold-time values of the one or more hold-time recommendations.

In some embodiments, the policy update engine can be trained to determine the one or more hold-time recommendations based at least in part on a respective treatment effect associated with a respective hold-time treatment level for each grouping of one or more experimental groupings, determined by a causal inference model (e.g., causal inference model 3110 (FIG. 3)). Each grouping of the one or more experimental groupings can include one or more respective grouping treatment units of treatment observation units and one or more respective grouping control units of control observation units. The one or more respective grouping treatment units and the one or more respective grouping control units can be assigned to the corresponding grouping based on a respective threshold and a respective similarity level between each respective pair of the one or more respective grouping treatment units and the one or more respective grouping control units.

In a number of embodiments, the one or more acts further can include implementing the one or more selected hold-time values, as determined. The one or more acts also can include after implementing the one or more selected hold-time values, determining one or more effects. In many embodiments, the one or more acts further can include transmitting the one or more selected hold-time values and the one or more effects to the policy update engine for retraining the policy update engine.

In many embodiments, the policy update engine (e.g., policy update engine 3120 (FIG. 3)) can include a reinforcement learning model (e.g., reinforcement learning model 31210 (FIG. 3)) trained by policy iteration. Determining the one or more hold-time recommendations can include: (a) evaluating the respective hold-time treatment level for the each grouping of the one or more experimental groupings based on a respective estimated reward determined by a state-value function (e.g., the function for estimating a cumulative reward (FIG. 7)) with the respective treatment effect associated with the respective hold-time treatment level for the each grouping of the one or more experimental groupings; and (b) updating the respective hold-time treatment level by a greedy function with the respective estimated reward.

In several embodiments, the causal inference model can be configured or trained to determine the respective treatment effect associated with the respective hold-time treatment level for the each grouping of the one or more experimental groupings. Determining the respective treatment effect can include classifying the treatment observation units in a treatment population and the control observation units in a control population into the one or more experimental groupings. Determining the respective treatment effect further can include determining, by one or more respective machine learning models (e.g., machine learning model(s) 31110 (FIG. 3), treatment model(s) 31111 (FIG. 3), control model(s) 31112 (FIG. 3), etc.) of the causal inference model for the each grouping of the one or more experimental groupings, the respective treatment effect for the each grouping based on one or more respective causal inference values associated with the respective hold-time treatment level for (a) each respective treatment unit of the one or more respective grouping treatment units of the treatment observation units and (b) a respective matched control unit of the one or more respective grouping control units of the control observation units for the each grouping.

In some embodiments, classifying the treatment observation units and the control observation units into the one or more experimental groupings can include before determining the respective matched control unit for the each respective treatment unit, determining, by a matching model (e.g., matching model 31120 (FIG. 3)), the respective similarity level between the each respective treatment unit and the respective matched control unit. The respective similarity level can be determined based on at least one of: (a) recursive partitioning based on one or more respective features for the each respective treatment unit and the respective matched control unit; (b) a respective cosine distance between respective feature embeddings for the each respective treatment unit and the respective matched control unit; or (c) propensity score matching based on the one or more respective features for the each respective treatment unit and the respective matched control unit.

In many embodiments, determining the respective treatment effect for the each grouping further can include training the causal inference model (e.g., causal inference model 3110 (FIG. 3)). Training the causal inference model can include training at least one of the one or more respective machine learning models (e.g., machine learning model(s) 31110 (FIG. 3), treatment model(s) 31111 (FIG. 3), control model(s) 31112 (FIG. 3), etc.) or the matching model (e.g., matching model 31120 (FIG. 3)).

In a number of embodiments, determining the respective treatment effect for the each grouping further can include, after the one or more respective grouping treatment units of the treatment observation units and the one or more respective grouping control units of the control observation units are assigned to the each grouping: (a) training a respective treatment model (e.g., treatment model(s) 31111 (FIG. 3)) of the one or more respective machine learning models (e.g., machine learning model(s) 31110 (FIG. 3)) for a respective treatment group of each grouping of the one or more experimental groupings based on the one or more respective grouping treatment units of the respective treatment group to determine a respective treatment causal inference value associated with a treatment level; and (b) training a respective control model (e.g., control model(s) 31112 (FIG. 3)) of the one or more respective machine learning models (e.g., machine learning model(s) 31110 (FIG. 3)) for a respective control group of each grouping of the one or more experimental groupings based on one or more respective grouping control units of the respective control group to determine a respective control causal inference value associated with a non-treatment level.

In some embodiments, the one or more acts further can include re-determining, by the policy update engine (e.g., policy update engine 3120 (FIG. 3)), the one or more hold-time recommendations based at least in part on the one or more effects and the one or more selected hold-time values. In many embodiments, the one or more acts additionally can include one or more of: (a) re-training the causal inference model (e.g., causal inference model 3110 (FIG. 3)) based at least in part on the one or more hold-time recommendations, as re-determined by the policy update engine; or (b) re-determining, by the causal inference model, the respective treatment effect associated with the one or more hold-time recommendations, as re-determined by the policy update engine (e.g., policy update engine 3120 (FIG. 3)), for the each grouping of the one or more experimental groupings for the policy update engine to iteratively re-determine the one or more hold-time recommendations.

In several embodiments, determining the respective treatment effect for the each grouping further can include: (a) determining, by the one or more respective machine learning models (e.g., machine learning model(s) 31110 (FIG. 3)), a respective treatment causal inference value of the one or more respective causal inference values for each respective treatment unit of the one or more respective grouping treatment units for the each grouping; (b) determining, by the one or more respective machine learning models, a respective control causal inference value of the one or more respective causal inference values for the respective matched control unit of the one or more respective grouping control units for the each grouping; and (c) determining, as the respective treatment effect for the each grouping, an average value of the respective treatment causal inference value for each respective treatment unit of the one or more respective grouping treatment units and the respective control causal inference value for the respective matched control unit of the one or more respective grouping control units.

Various embodiments further can include a method for dynamically updating a hold-time value for a resource based on one or more recommendations. The method can be implemented via execution of computing instructions configured to run at one or more processors and stored at one or more non-transitory computer-readable media. In many embodiments, the method can include: (a) upon receiving, from a policy update engine (e.g., policy update engine 3120 (FIG. 3)), one or more hold-time recommendations, selectively determining, based on one or more selection rules, one or more selected hold-time values of the one or more hold-time recommendations; (b) implementing the one or more selected hold-time values, as determined; (c) after implementing the one or more selected hold-time values, determining one or more effects associated with the one or more selected hold-time values; and (d) transmitting the one or more selected hold-time values and the one or more effects to the policy update engine for retraining.

In a number of embodiments, the policy update engine (e.g., policy update engine 3120 (FIG. 3)) can be trained (e.g., reinforcement learning model 31210 (FIG. 3)) to determine the one or more hold-time recommendations based at least in part on a respective treatment effect associated with a respective hold-time treatment level for each grouping of one or more experimental groupings, determined by a causal inference model (e.g., causal inference model 3110 (FIG. 3)). Each grouping of the one or more experimental groupings can include one or more respective grouping treatment units of treatment observation units and one or more respective grouping control units of control observation units assigned to the each grouping based on a respective threshold and a respective similarity level between each respective pair of the one or more respective grouping treatment units and the one or more respective grouping control units.

In many embodiments, the policy update engine (e.g., policy update engine 3120 (FIG. 3)) can include a reinforcement learning model (e.g., reinforcement learning model 31210 (FIG. 3)) trained by policy iteration. Determining the one or more hold-time recommendations by the policy update engine can include: (a) evaluating the respective hold-time treatment level for the each grouping of the one or more experimental groupings based on a respective estimated reward determined by a state-value function (e.g., the state-value function (FIG. 7)) with the respective treatment effect associated with the respective hold-time treatment level for the each grouping of the one or more experimental groupings; and (b) updating the respective hold-time treatment level by a greedy function with the respective estimated reward.

In a number of embodiments, the causal inference model can be configured to determine the respective treatment effect associated with the respective hold-time treatment level for the each grouping of the one or more experimental groupings by: (a) classifying the treatment observation units in a treatment population and the control observation units in a control population into the one or more experimental groupings; and (b) determining, by one or more respective machine learning models (e.g., machine learning model(s) 31110 (FIG. 3)) of the causal inference model (e.g., causal inference model 3110 (FIG. 3)) for the each grouping of the one or more experimental groupings, the respective treatment effect for the each grouping based on one or more respective causal inference values associated with the respective hold-time treatment level for (a) each respective treatment unit of the one or more respective grouping treatment units of the treatment observation units and (b) a respective matched control unit of the one or more respective grouping control units of the control observation units for the each grouping.

In some embodiments, classifying the treatment observation units and the control observation units into the one or more experimental groupings further can include, before determining the respective matched control unit for the each respective treatment unit, determining, by a matching model (e.g., matching model 31120 (FIG. 3)), the respective similarity level between the each respective treatment unit and the respective matched control unit based on at least one of: (a) recursive partitioning based on one or more respective features for the each respective treatment unit and the respective matched control unit; (b) a respective cosine distance between respective feature embeddings for the each respective treatment unit and the respective matched control unit; or (c) propensity score matching based on the one or more respective features for the each respective treatment unit and the respective matched control unit.

In many embodiments, determining the respective treatment effect for the each grouping further can include training the causal inference model (e.g., causal inference model 3110 (FIG. 3)). Training the causal inference model can include training at least one of the one or more respective machine learning models (e.g., machine learning model(s) 31110 (FIG. 3), treatment model(s) 31111 (FIG. 3), control model(s) 31112 (FIG. 3), etc.) or the matching model (e.g., matching model 31120 (FIG. 3)).

In several embodiments, determining the respective treatment effect for the each grouping further can include, after the one or more respective grouping treatment units of the treatment observation units and the one or more respective grouping control units of the control observation units are assigned to the each grouping: (a) training a respective treatment model of the one or more respective machine learning models for a respective treatment group of each grouping of the one or more experimental groupings based on the one or more respective grouping treatment units of the respective treatment group to determine a respective treatment causal inference value associated with a treatment level; and (b) training a respective control model of the one or more respective machine learning models for a respective control group of each grouping of the one or more experimental groupings based on one or more respective grouping control units of the respective control group to determine a respective control causal inference value associated with a non-treatment level.

In many embodiments, the method further can include re-determining, by the policy update engine (e.g., policy update engine 3120 (FIG. 3)), the one or more hold-time recommendations based at least in part on the one or more effects and the one or more selected hold-time values. The method additionally can include one or more of: (a) re-training the causal inference model (e.g., causal inference model 3110 (FIG. 3)) based at least in part on the one or more hold-time recommendations, as re-determined by the policy update engine; or (b) re-determining, by the causal inference model, the respective treatment effect associated with the one or more hold-time recommendations, as re-determined by the policy update engine, for each grouping of the one or more experimental groupings for the policy update engine to iteratively re-determine the one or more hold-time recommendations.

In a number of embodiments, determining the respective treatment effect for the each grouping further can include: (a) determining, by the one or more respective machine learning models (e.g., machine learning model(s) 31110 (FIG. 3)), a respective treatment causal inference value of the one or more respective causal inference values for each respective treatment unit of the one or more respective grouping treatment units for the each grouping; (b) determining, by the one or more respective machine learning models, a respective control causal inference value of the one or more respective causal inference values for the respective matched control unit of the one or more respective grouping control units for the each grouping; and (c) determining, as the respective treatment effect for the each grouping, an average value of the respective treatment causal inference value for each respective treatment unit of the one or more respective grouping treatment units and the respective control causal inference value for the respective matched control unit of the one or more respective grouping control units.

Various embodiments can include a system for dynamically determining hold-time recommendations based on estimated causal effects. The system can include one or more processors and one or more non-transitory computer-readable media storing computing instructions configured to, when run on the one or more processors, cause the one or more processors to perform one or more acts. The one or more acts can include determining, by a causal inference model, a respective treatment effect associated with a respective hold-time treatment level for each grouping of one or more experimental groupings. In many embodiments, the act of determining the respective treatment effect associated with the respective hold-time treatment level for the each grouping can include: (a) classifying treatment observation units in a treatment population and control observation units in a control population into the one or more experimental groupings; and (b) determining, by one or more respective machine learning models of the causal inference model for each grouping of the one or more experimental groupings, the respective treatment effect for the each grouping based on one or more respective causal inference values associated with the respective hold-time treatment level for each respective treatment unit of one or more respective grouping treatment units of the treatment observation units and the respective matched control unit of one or more respective grouping control units of the control observation units for the each grouping.

In a number of embodiments, the act of classifying the treatment observation units and the control observation units into the one or more experimental groupings can include: (a) determining a respective matched control unit of the control observation units for each respective treatment unit of the treatment observation units based on a respective similarity level between the each respective treatment unit and the respective matched control unit; and (b) assigning the each respective treatment unit and the respective matched control unit to a respective grouping of the one or more experimental groupings based on the respective similarity level and a respective threshold associated with the respective grouping.

In many embodiments, the one or more acts further can include determining, by a policy update engine, one or more hold-time recommendations based at least in part on the respective treatment effect associated with the respective hold-time treatment level for each grouping of the one or more experimental groupings, as determined by the causal inference model. The one or more acts additionally can include transmitting the one or more hold-time recommendations to an implementation system to cause an implementation of one or more hold-time values of the one or more hold-time recommendations. Moreover, the one or more acts can include re-training the policy update engine based at least in part on one or more effects of the implementation and the one or more hold-time values.

Various embodiments can include a method for dynamically determining hold-time recommendations based on estimated causal effects. The method can be implemented via execution of computing instructions configured to run at one or more processors and stored at one or more non-transitory computer-readable media. In many embodiments, the method can include determining, by a causal inference model, a respective treatment effect associated with a respective hold-time treatment level for each grouping of one or more experimental groupings. Determining the respective treatment effect associated with the respective hold-time treatment level for the each grouping can include: (a) classifying treatment observation units in a treatment population and control observation units in a control population into the one or more experimental groupings; and (b) determining, by one or more respective machine learning models of the causal inference model for each grouping of the one or more experimental groupings, the respective treatment effect for the each grouping based on one or more respective causal inference values associated with the respective hold-time treatment level for: (i) each respective treatment unit of one or more respective grouping treatment units of the treatment observation units, and (ii) the respective matched control unit of one or more respective grouping control units of the control observation units for the each grouping.

In some embodiments, classifying the treatment observation units and the control observation units into the one or more experimental groupings can include: (a) determining a respective matched control unit of the control observation units for each respective treatment unit of the treatment observation units based on a respective similarity level between the each respective treatment unit and the respective matched control unit; and (b) assigning the each respective treatment unit and the respective matched control unit to a respective grouping of the one or more experimental groupings based on the respective similarity level and a respective threshold associated with the respective grouping.

In many embodiments, the method further can include determining, by a policy update engine, one or more hold-time recommendations based at least in part on the respective treatment effect associated with the respective hold-time treatment level for each grouping of the one or more experimental groupings, as determined by the causal inference model. The method also can include transmitting the one or more hold-time recommendations to an implementation system to cause an implementation of one or more hold-time values of the one or more hold-time recommendations. Furthermore, the method can include re-training the policy update engine based at least in part on one or more effects of the implementation and the one or more hold-time values.

In many embodiments, the techniques described herein can provide a practical application and several technological improvements. In some embodiments, the techniques described herein can provide a fully-automated feedback-based system or method to dynamically determining and/or implementing one or more server parameters, such as hold-time values for various resources, based on estimated causal effects. These techniques described herein can provide a significant improvement over conventional server configuring approaches. Indeed, the techniques can improve over conventional approaches by determining causal effects of a treatment level without A/B tests used by conventional systems that can interrupt or negatively impact the operation of the server.

In a number of embodiments, the techniques described herein can solve a technical problem that arises only within the realm of computer environment, as dynamic feedback-based server parameter optimization, do not exist outside the realm of computer networks. Moreover, the techniques described herein can solve a technical problem that cannot be solved outside the context of computer networks. Specifically, the techniques described herein cannot be used outside the context of computer networks, in view of a lack of data.

Although dynamically determining hold-time recommendations based on estimated causal effects has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4-6 may include different procedures, processes, and/or activities and be performed by many different models or layers, in many different orders. As another example, the modules, models, elements, and/or systems within system 300, system 310, or implementation system 320 in FIG. 3 or used in method 400 in FIG. 4, method 500 in FIG. 5, or method 600 in FIG. 6 can be interchanged or otherwise modified. Further, the systems and/or methods can include training the causal inference model, the policy update engine, and/or the one or more respective machine learning models in system 300 or 310 in FIG. 3 based on training datasets and/or feedback from the system or server implementing the treatment levels. Moreover, the systems and/or methods can include optimizing the causal inference model, the policy update engine, and/or the one or more respective machine learning models in system 300 or 310 in FIG. 3 by adjusting the hyper-parameters used.

Further, in many embodiments, one or more machine learning models (e.g., causal inference model 3110 (FIG. 3), machine learning model(s) 31110 (FIG. 3), treatment model(s) 31111 (FIG. 3), control model(s) 31112 (FIG. 3), matching model 31120 (FIG. 3), policy update engine 3120 (FIG. 3), and/or reinforcement learning model 31210 (FIG. 3), etc.) can be pre-trained or trained to perform one or more of the above-mentioned procedures, processes, activities, and/or methods in system 300 (FIG. 3), system 310 (FIG. 3), method 400 (FIG. 4), method 500 (FIG. 5), and/or method 600 (FIG. 6). Examples of the algorithms used for the machine learning models can include linear regression, binary regression, logistic regression, random forest, neural networks, convolutional neural networks (CNNs), XGBoost, gradient boosting, reinforcement learning, and so forth.

Additionally, in various embodiments, each of the machine learning models used can be trained once or dynamically and/or regularly (e.g., every day, every week, etc.). The training of each of the machine learning models can be supervised, semi-supervised, and/or unsupervised. The training data of training datasets for pre-training or re-training each of the machine learning models can be collected from various data sources, including synthetic training data, historical input and/or output data by the machine learning model, feedback from users or another system, server, or model, etc. For example, in a number of embodiments, the input and/or output data of a machine learning model can be curated by a user (e.g., a machine learning engineer, etc.) or automatically collected every time the machine learning model generates new output data to update the training datasets for re-training the machine learning model. In many embodiments, the trained and/or re-trained machine learning model as well as the training datasets can be stored in, updated, and accessed from a database (e.g., database(s) 350 (FIG. 3)).

In some embodiments, the users, systems, and/or methods further can determine whether to add the newly-created historical input and/or output data and/or feedback to the training dataset for retraining the machine learning model(s) based on user or system feedback, predetermined criteria, and/or confidence scores for the historical output data. The user feedback can be associated with the output data of the machine learning model(s) or the output of the systems and/or methods using the machine learning model(s) (e.g., system 300 (FIG. 3), system 310 (FIG. 3), method 400 (FIG. 4), method 500 (FIG. 5), method 600 (FIG. 6), etc.). Examples of feedback can include a review score, one or more user actions (e.g., a user's decision to add an item to the online shopping cart, or increased/decreased user orders or GMV, etc.), and so forth.

In embodiments where machine learning techniques are not explicitly described in the processes, procedures, activities, and/or methods, such processes, procedures, activities, and/or methods can be read to include machine learning techniques suitable to perform the intended activities (e.g., determining, processing, analyzing, generating, etc.). In a number of embodiments, the one or more machine learning models can be configured to start or stop automatically upon occurrence of predefined events and/or conditions. In certain embodiments, the systems and/or methods can use a pre-trained machine learning model, without any re-training.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions configured to, when run on the one or more processors, cause the one or more processors to perform:

training a causal inference machine learning (ML) model to determine treatment effects related to user engagement with a website associated with hold-time treatment levels applied to resources accessed through the website;

training a policy update engine to determine one or more hold-time recommendations using the treatment effects and the hold-time treatment levels;

wherein the policy update engine comprises a reinforcement learning model trained by policy iteration;

upon receiving, from the policy update engine, one or more hold-time recommendations, selectively determining, based on one or more selection rules, one or more selected hold-time values of the one or more hold-time recommendations, wherein:

the causal inference ML model determines a respective treatment effect related to user engagement with the website associated with a respective hold-time treatment level for each grouping of one or more experimental groupings, wherein each grouping of the one or more experimental groupings comprises one or more respective grouping treatment units of treatment observation units and one or more respective grouping control units of control observation units assigned to the each grouping based on a respective threshold and a respective similarity level between each respective pair of the one or more respective grouping treatment units and the one or more respective grouping control units; and the policy update engine determines the one or more hold-time recommendations using the respective treatment effect associated with the respective hold-time treatment level for each grouping, determined by the causal inference ML model; and implementing the one or more selected hold-time values, as determined, on the resources accessed through the website;

after implementing the one or more selected hold-time values, determining one or more effects on user engagement with the website associated with the one or more selected hold-time values;

transmitting the one or more selected hold-time values and the one or more effects to the policy update engine and retraining the policy update engine on the one or more selected hold-time values and the one or more effects as feedback;

re-determining, by the retrained policy update engine, the one or more hold-time recommendations; and retraining the causal inference ML model using the one or more hold-time recommendations, as re-determined by the policy update engine.

2. The system in claim 1, wherein:

the causal inference ML model is configured to determine the respective treatment effect associated with the respective hold-time treatment level for the each grouping of the one or more experimental groupings by:

classifying the treatment observation units in a treatment population and the control observation units in a control population into the one or more experimental groupings; and determining, by one or more respective machine learning models of the causal inference ML model for the each grouping of the one or more experimental groupings, the respective treatment effect for the each grouping based on one or more respective causal inference values associated with the respective hold-time treatment level for (a) each respective treatment unit of the one or more respective grouping treatment units of the treatment observation units and (b) a respective matched control unit of the one or more respective grouping control units of the control observation units for the each grouping.

3. The system in claim 2, wherein classifying the treatment observation units and the control observation units into the one or more experimental groupings further comprises:

before determining the respective matched control unit for the each respective treatment unit, determining, by a matching model, the respective similarity level between the each respective treatment unit and the respective matched control unit based on at least one of:

recursive partitioning based on one or more respective features for the each respective treatment unit and the respective matched control unit;

a respective cosine distance between respective feature embeddings for the each respective treatment unit and the respective matched control unit; or propensity score matching based on the one or more respective features for the each respective treatment unit and the respective matched control unit.

4. The system in claim 3, wherein determining the respective treatment effect for the each grouping further comprises training the causal inference ML model by training at least one of the one or more respective machine learning models or the matching model.

5. The system in claim 2, wherein determining the respective treatment effect for the each grouping further comprises, after the one or more respective grouping treatment units of the treatment observation units and the one or more respective grouping control units of the control observation units are assigned to the each grouping:

training a respective treatment model of the one or more respective machine learning models for a respective treatment group of each grouping of the one or more experimental groupings based on the one or more respective grouping treatment units of the respective treatment group to determine a respective treatment causal inference value associated with a treatment level; and training a respective control model of the one or more respective machine learning models for a respective control group of each grouping of the one or more experimental groupings based on one or more respective grouping control units of the respective control group to determine a respective control causal inference value associated with a non-treatment level.

6. The system in claim 5, wherein retraining the causal inference ML model comprises retraining at least one of the respective treatment model and the respective control model based at least in part on the one or more hold-time recommendations, as re-determined by the policy update engine.

7. The system in claim 2, wherein determining the respective treatment effect for the each grouping further comprises:

determining, by the one or more respective machine learning models, a respective treatment causal inference value of the one or more respective causal inference values for each respective treatment unit of the one or more respective grouping treatment units for the each grouping;

determining, by the one or more respective machine learning models, a respective control causal inference value of the one or more respective causal inference values for the respective matched control unit of the one or more respective grouping control units for the each grouping; and determining, as the respective treatment effect for the each grouping, an average value of the respective treatment causal inference value for each respective treatment unit of the one or more respective grouping treatment units and the respective control causal inference value for the respective matched control unit of the one or more respective grouping control units.

8. The system in claim 1, wherein the computing instructions are further configured, when run on the one or more processors, to cause the one or more processors to perform one or more of:

re-determining, by the causal inference ML model, the respective treatment effect associated with the one or more hold-time recommendations, as re-determined by the policy update engine, for the each grouping of the one or more experimental groupings for the policy update engine to iteratively re-determine the one or more hold-time recommendations.

9. The system in claim 1, wherein determining the one or more hold-time recommendations comprises:

evaluating the respective hold-time treatment level for the each grouping of the one or more experimental groupings based on a respective estimated reward determined by a state-value function with the respective treatment effect associated with the respective hold-time treatment level for the each grouping of the one or more experimental groupings; and updating the respective hold-time treatment level by a greedy function with the respective estimated reward.

10. A method being implemented via execution of computing instructions configured to run at one or more processors and stored at one or more non-transitory computer-readable media, the method comprising:

training a causal inference machine learning (ML) model to determine treatment effects related to user engagement with a website associated with hold-time treatment levels applied to resources accessed through the website;

training a policy update engine to determine one or more hold-time recommendations using the treatment effects and the hold-time treatment levels;

wherein the policy update engine comprises a reinforcement learning model trained by policy iteration;

upon receiving, from the policy update engine, one or more hold-time recommendations, selectively determining, based on one or more selection rules, one or more selected hold-time values of the one or more hold-time recommendations, wherein:

the causal inference ML model determines a respective treatment effect related to user engagement with the website associated with a respective hold-time treatment level for each grouping of one or more experimental groupings, wherein each grouping of the one or more experimental groupings comprises one or more respective grouping treatment units of treatment observation units and one or more respective grouping control units of control observation units assigned to the each grouping based on a respective threshold and a respective similarity level between each respective pair of the one or more respective grouping treatment units and the one or more respective grouping control units; and the policy update engine determines the one or more hold-time recommendations using the respective treatment effect associated with the respective hold-time treatment level for each grouping, determined by the causal inference ML model; and implementing the one or more selected hold-time values, as determined, on the resources accessed through the website;

after implementing the one or more selected hold-time values, determining one or more effects on user engagement with the website associated with the one or more selected hold-time values;

transmitting the one or more selected hold-time values and the one or more effects to the policy update engine and retraining the policy update engine on the one or more selected hold-time values and the one or more effects as feedback;

re-determining, by the retrained policy update engine, the one or more hold-time recommendations; and retraining the causal inference ML model using the one or more hold-time recommendations, as re-determined by the policy update engine.

11. The method in claim 10, wherein:

the causal inference ML model is configured to determine the respective treatment effect associated with the respective hold-time treatment level for the each grouping of the one or more experimental groupings by:

classifying the treatment observation units in a treatment population and the control observation units in a control population into the one or more experimental groupings; and determining, by one or more respective machine learning models of the causal inference ML model for the each grouping of the one or more experimental groupings, the respective treatment effect for the each grouping based on one or more respective causal inference values associated with the respective hold-time treatment level for (a) each respective treatment unit of the one or more respective grouping treatment units of the treatment observation units and (b) a respective matched control unit of the one or more respective grouping control units of the control observation units for the each grouping.

12. The method in claim 11, wherein classifying the treatment observation units and the control observation units into the one or more experimental groupings further comprises:

before determining the respective matched control unit for the each respective treatment unit, determining, by a matching model, the respective similarity level between the each respective treatment unit and the respective matched control unit based on at least one of:

recursive partitioning based on one or more respective features for the each respective treatment unit and the respective matched control unit;

a respective cosine distance between respective feature embeddings for the each respective treatment unit and the respective matched control unit; or propensity score matching based on the one or more respective features for the each respective treatment unit and the respective matched control unit.

13. The method in claim 12, wherein determining the respective treatment effect for the each grouping further comprises training the causal inference ML model by training at least one of the one or more respective machine learning models or the matching model.

14. The method in claim 11, wherein determining the respective treatment effect for the each grouping further comprises, after the one or more respective grouping treatment units of the treatment observation units and the one or more respective grouping control units of the control observation units are assigned to the each grouping:

training a respective treatment model of the one or more respective machine learning models for a respective treatment group of each grouping of the one or more experimental groupings based on the one or more respective grouping treatment units of the respective treatment group to determine a respective treatment causal inference value associated with a treatment level; and training a respective control model of the one or more respective machine learning models for a respective control group of each grouping of the one or more experimental groupings based on one or more respective grouping control units of the respective control group to determine a respective control causal inference value associated with a non-treatment level.

15. The method in claim 10, wherein the computing instructions are further configured, when run on the one or more processors, to cause the one or more processors to perform one or more of:

re-determining, by the causal inference ML model, the respective treatment effect associated with the one or more hold-time recommendations, as re-determined by the policy update engine, for the each grouping of the one or more experimental groupings for the policy update engine to iteratively re-determine the one or more hold-time recommendations.

16. The method in claim 11, wherein determining the respective treatment effect for the each grouping further comprises:

determining, by the one or more respective machine learning models, a respective treatment causal inference value of the one or more respective causal inference values for each respective treatment unit of the one or more respective grouping treatment units for the each grouping;

determining, by the one or more respective machine learning models, a respective control causal inference value of the one or more respective causal inference values for the respective matched control unit of the one or more respective grouping control units for the each grouping; and determining, as the respective treatment effect for the each grouping, an average value of the respective treatment causal inference value for each respective treatment unit of the one or more respective grouping treatment units and the respective control causal inference value for the respective matched control unit of the one or more respective grouping control units.

17. The method in claim 10, wherein determining the one or more hold-time recommendations comprises:

evaluating the respective hold-time treatment level for the each grouping of the one or more experimental groupings based on a respective estimated reward determined by a state-value function with the respective treatment effect associated with the respective hold-time treatment level for the each grouping of the one or more experimental groupings; and updating the respective hold-time treatment level by a greedy function with the respective estimated reward.

\* \* \* \* \*